Patented Nov. 2, 1926.

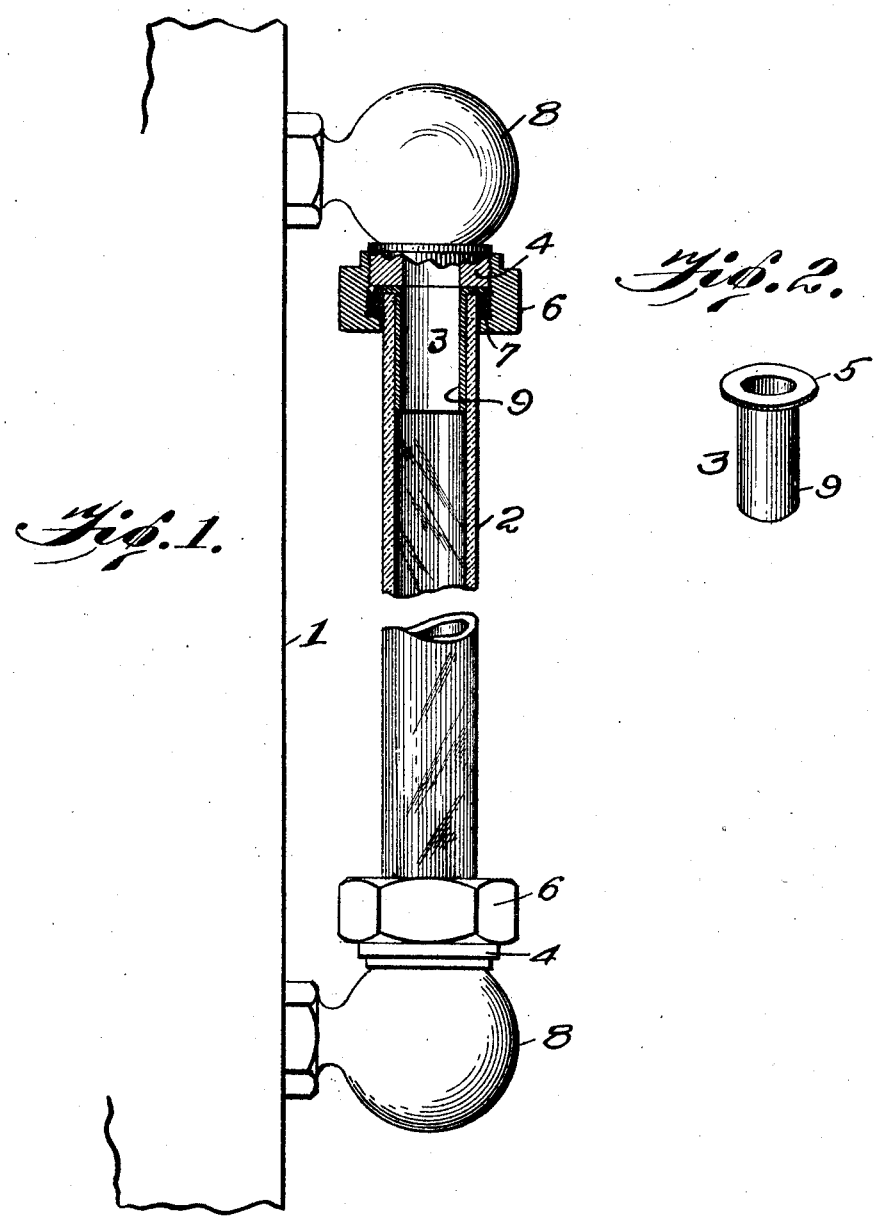

1,605,226

UNITED STATES PATENT OFFICE.

CHARLES FRICKE, SR., AND CHARLES FRICKE, JR., OF ALLIANCE, NEBRASKA.

WATER GAUGE.

Application filed November 19, 1925. Serial No. 70,090.

This invention relates to water gauges and the object of the same is the provision of means for eliminating the breaking of water glasses in any locomotive, stationary or other steam boilers.

It is to be understood that a water glass wears away from the top or end, caused by continual cutting of lime, mud, and water treating ingredients, and causes a glass to burst, so in using our devices in combination, one in the top and one in the bottom of a glass, it will make a glass last from four to five years, because there will be no wear to cause the glass to break. In the course of time, the gaskets will leak, and if they are changed twice a year, the life of a glass will be greatly increased unless broken by other causes.

With the foregoing and other objects in view, our invention comprises certain combinations, constructions and arrangements of parts as will be illustrated in the accompanying drawings, described in the specification, and more particularly pointed out in the appended claim.

In the drawings:

Figure 1 is a view partly in elevation and partly in section of a water gauge embodying our invention.

Figure 2 is a perspective view of a copper or other metal protecting device that we have perfected, used in combination with the other parts of a water gauge.

Referring to the drawings by numerals, 1 designates the boiler, to which the water gauge is attached. This water gauge includes a glass tube 2, copper or other metal protecting devices 3, one at each end, two rings 4 (one at each end) laid against the thin outer flange 5 of the protecting devices 3, with caps 6 screwed upon the rings 4, as shown in Figure 1. Within each cap 6 is a rubber gasket 7, which clamps against the inner face of flange 5, as well as against the upper end of the glass tube 2, thereby sealing the end against any possibility of water leaking through to the cap 6. Suitable connecting means 8 is formed upon the ring 4 for connecting the device to boiler 1.

The protecting devices 3 include a thin cylindrical body 9 which fits preferably tight against the inner wall of glass tube 2 and a considerable distance therein, with the end covered by outer flange 5 formed on the body 3. This device 3 covers the outer end of tube 2, as well as preventing water from coming in contact with the tube 2 a considerable distance from the end thereof. This device 3 practically seals the outer ends of the glass tube 2, which prevents the continual cutting of lime, mud, and water treating ingredients on said glass tube, thereby increasing the life of the tube.

It is to be noted that as each ring 4 is screwed more tightly into its respective cap 6, the rubber gasket 7 will be crowded more forcefully against the flange 5, whereby it will be impossible for any water to pass between ring 4 and flange 5, or between tube 2 and gasket 7, to the cap 6.

We have produced a very efficient structure with reference to both the thin protecting devices and the water gauge as a whole, resulting in meritorious advantages as hereinbefore mentioned.

The protecting device 3 at the top of the tube 2 has a relatively long cylindrical body 9 with a relatively narrow flanged end 5, for fitting snugly and efficiently in the complete device, as clearly shown in Figure 1, the device 3 at the bottom has a relatively short body 9 so that the glass can be read all the way down to the lower cap 6.

While we have described the preferred embodiment of our invention, and have illustrated the same in the accompanying drawings, certain minor changes or alterations may appear to one skilled in the art to which this invention relates, during the extensive manufacture of the same, and, we, therefore, reserve the right to make such alterations or changes as shall fairly fall within the scope of the appended claim.

What we claim is:

In a device of the class described, the combination of a glass tube, copper protecting devices in the ends of said glass tube, each protecting device comprising a comparatively long cylindrical body fitting tightly against the inner face of the glass tube, said body provided at its outer end with a narrow flange against the outer end of the glass tube, a rubber gasket on said glass tube and against the inner face of said flange and extending slightly beyond the edge of the flange, a cap over said flange and gasket, and a ring provided with boiler attaching means element threaded into said cap and against the outer face of said flange and adapted to be held tightly against the outer face of said flange and clamping the gasket tightly against the glass tube and the inner face of the flange, substantially as shown and described.

In testimony whereof we hereunto affix our signatures.

CHARLES FRICKE, Jr.
CHARLES FRICKE, Sr.